(12) United States Patent
Song et al.

(10) Patent No.: US 11,750,257 B2
(45) Date of Patent: Sep. 5, 2023

(54) INFORMATION REPORTING METHOD, TERMINAL AND NETWORK DEVICE

(71) Applicant: VIVO MOBILE COMMUNICATION CO.,LTD., Guangdong (CN)

(72) Inventors: Yang Song, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 261 days.

(21) Appl. No.: 17/039,264

(22) Filed: Sep. 30, 2020

(65) Prior Publication Data
US 2021/0028844 A1 Jan. 28, 2021

Related U.S. Application Data

(63) Continuation of application No. PCT/CN2019/081233, filed on Apr. 3, 2019.

(30) Foreign Application Priority Data

Apr. 3, 2018 (CN) .......................... 201810291348.9

(51) Int. Cl.
*H04B 7/06* (2006.01)
*H04B 17/327* (2015.01)
(Continued)

(52) U.S. Cl.
CPC ......... *H04B 7/0626* (2013.01); *H04B 17/327* (2015.01); *H04L 5/0057* (2013.01); *H04W 72/21* (2023.01); *H04W 76/28* (2018.02)

(58) Field of Classification Search
CPC ..... H04B 7/0626; H04B 7/327; H04L 5/0057; H04L 5/00; H04L 5/0053; H04L 1/0026;
(Continued)

(56) References Cited

U.S. PATENT DOCUMENTS

2012/0218929 A1 8/2012 Son et al.
2012/0314611 A1 12/2012 Baker et al.
(Continued)

FOREIGN PATENT DOCUMENTS

CN 104704881 A 6/2015
DE 102015009779 A1 2/2017
(Continued)

OTHER PUBLICATIONS

"3rd Generation Partnership Project; Technical Specification Group Radio Access Network; Study on New Radio (NR) Access Technology (Release 14)" 3GPP TR 38.912 V0.0.2 (Mar. 2017).
(Continued)

*Primary Examiner* — Habte Mered
(74) *Attorney, Agent, or Firm* — Maschoff Brennan (57) ABSTRACT

Embodiments of the present disclosure provide an information reporting method, a terminal and a network device for defining reporting rules of CSI report for the terminal which is in the DRX mode and in the inactive time. The method includes: when the terminal is in a discontinuous reception (DRX) mode, determining, according to first information, whether the terminal in an inactive time reports a channel state information (CSI) report. The first information is configured to indicate allowing the terminal in the inactive time to report the CSI report at a CSI report instant, or prohibiting the terminal in the inactive time from reporting a semi-persistent or aperiodic CSI report reported on a physical uplink shared channel (PUSCH) at the CSI report instant.

20 Claims, 4 Drawing Sheets

(51) Int. Cl.
*H04W 76/28* (2018.01)
*H04L 5/00* (2006.01)
*H04W 72/21* (2023.01)

(58) Field of Classification Search
CPC ....... H04L 1/0057; H04L 1/06; H04L 1/0675; H04W 72/0413; H04W 72/08; H04W 76/28; H04W 24/10; H04W 52/0212; H04W 52/0232; H04W 52/02; H04W 52/0229; Y02D 30/70
See application file for complete search history.

(56) References Cited

U.S. PATENT DOCUMENTS

| | | | |
|---|---|---|---|
| 2014/0105049 A1* | 4/2014 | Kim | H04L 5/0057 370/252 |
| 2015/0215825 A1 | 7/2015 | Kim et al. | |
| 2016/0294531 A1* | 10/2016 | Loehr | H04W 72/21 |
| 2018/0097598 A1* | 4/2018 | Ang | H04W 52/0245 |
| 2018/0213482 A1* | 7/2018 | Dortmund | H04W 64/006 |
| 2019/0215897 A1* | 7/2019 | Babaei | H04W 76/38 |
| 2019/0254110 A1* | 8/2019 | He | H04W 76/28 |
| 2019/0281546 A1* | 9/2019 | Lim | H04W 24/10 |
| 2019/0306915 A1* | 10/2019 | Jin | H04W 76/28 |
| 2019/0349120 A1* | 11/2019 | Cheng | H04L 5/0053 |
| 2020/0367087 A1* | 11/2020 | Lim | H04W 24/10 |

FOREIGN PATENT DOCUMENTS

| | | | |
|---|---|---|---|
| EP | 2 362 563 A1 | 8/2011 | |
| JP | 2013520893 A | 6/2013 | |
| WO | 2014101107 A1 | 7/2014 | |
| WO | WO-2014113954 A1 * | 7/2014 | .......... H04L 1/0026 |
| WO | 2017172047 A1 | 10/2017 | |
| WO | 2017197642 A1 | 11/2017 | |
| WO | WO-2017197642 A1 * | 11/2017 | ......... H04L 25/0226 |
| WO | WO-2019120520 A1 * | 6/2019 | .......... H04L 1/0026 |

OTHER PUBLICATIONS

EP Search Report in Application No. 19781987.3 dated Apr. 19, 2021.

Chinese Office Action issued in corresponding application No. 201810291348.9, dated Apr. 14, 2020.

International Search Report and Written Opinion issued in corresponding application No. PCT/CN2019/081233, dated Oct. 15, 2020.

"Summary of View on CSI Reporting", 3GPP TSG-RAN WG1 #91, R1-1721451, Reno, USA, Nov. 27-Dec. 1, 2017.

"Enhancement in DRX Solution for IDC", 3GPP TSG-RAN WG2 Meeting #77bis, R2-121246, Jeju, Korea, Mar. 26-30, 2012.

"CSI Report During Inactive Time", 3GPP TSG-RAN WG2#102, R2-1807002, Busan, Korea, May 21-25, 2018.

Japanese Office Action from corresponding JP Application No. 2020553503, dated Dec. 13, 2021.

"Remaining Issue on RRM Measurement" 3GPP TSG RAN WG1 Meeting AH 1801, R1-1800178, Vancouver Canada, Jan. 22-26, 2018, 5 pages.

Chinese Office Action dated Nov. 30, 2022 as received in application No. 202011092887.3.

* cited by examiner

FIG. 1 when a terminal is in a DRX mode, determining, by the terminal, according to first information, whether the terminal in an inactive time reports a CSI report — S201

INFORMATION REPORTING METHOD, TERMINAL AND NETWORK DEVICE

CROSS-REFERENCE TO RELATED APPLICATION

This application is a continuation application of International Application No. PCT/CN2019/081233 filed on Apr. 3, 2019, which claims the priority of Chinese Application No. 201810291348.9, filed on Apr. 3, 2018, which is incorporated herein by reference in its entirety.

TECHNICAL FIELD

The present disclosure relates to the field of communication technology, and in particular to an information reporting method, a terminal and a network device.

BACKGROUND

Regardless of whether a user equipment (User Equipment, UE) is in a radio resource control (Radio Resource Control, RRC) idle (RRC IDLE) state or an RRC connected (RRC CONNECTED) state, the UE always monitors a physical downlink control channel (Physical Downlink Control Channel, PDCCH) to check whether there is information from a serving cell. However, in practical applications, there is no data interaction between the UE and a network device in most of the time, and if the UE continues monitoring the PDCCH in this situation, it will cause unnecessary power consumption for the UE. In order to achieve the purpose of saving power for the UE, a discontinuous reception (Discontinuous Reception, DRX) mechanism has emerged.

In the discontinuous reception (Discontinuous Reception, DRX) mode, a DRX cycle is configured for the UE. One DRX cycle includes an active time (Active Time) and an inactive time (i.e., outside the active time). In the active time (i.e., when the UE needs to monitor the PDCCH), the UE monitors and receives the PDCCH. In the inactive time, the UE enters a sleep state, and does not monitor the PDCCH to reduce power consumption of the UE.

However, the protocols in related art do not provide comprehensive provisions for CSI report by the UE in the DRX mode, and there is no provision for CSI report by a terminal in the inactive time.

SUMMARY

Embodiments of the present disclosure provide an information reporting method, a terminal and a network device for defining reporting rules of CSI report for the terminal which is in the DRX mode and in the inactive time.

In a first aspect, one embodiment of the present disclosure provides an information reporting method, operable by a terminal, including:

when the terminal is in a discontinuous reception (DRX) mode, determining, according to first information, whether the terminal in an inactive time reports a channel state information (CSI) report;

wherein the first information is configured to indicate allowing the terminal in the inactive time to report the CSI report at a CSI report instant, or prohibiting the terminal in the inactive time from reporting a semi-persistent or aperiodic CSI report reported on a physical uplink shared channel (PUSCH) at the CSI report instant.

In a second aspect, one embodiment of the present disclosure provides an information reporting method, operable by a network device, including:

when a terminal is in a discontinuous reception (DRX) mode, transmitting first information to the terminal; wherein the first information is configured to instruct the terminal to determine, according to the first information, whether the terminal in an inactive time reports a channel state information (CSI) report; the first information is configured to indicate allowing the terminal in the inactive time to report the CSI report at a CSI report instant, or prohibiting the terminal in the inactive time from reporting a semi-persistent or aperiodic CSI report reported on a physical uplink shared channel (PUSCH) at the CSI report instant.

In a third aspect, one embodiment of the present disclosure provides a terminal, including:

a determining module configured to, when the terminal is in a discontinuous reception (DRX) mode, determine, according to first information, whether the terminal in an inactive time reports a channel state information (CSI) report;

wherein the first information is configured to indicate allowing the terminal in the inactive time to report the CSI report at a CSI report instant, or prohibiting the terminal in the inactive time from reporting a semi-persistent or aperiodic CSI report reported on a physical uplink shared channel (PUSCH) at the CSI report instant.

In a fourth aspect, one embodiment of the present disclosure provides a network device, including:

a transmission module, configured to, when a terminal is in a discontinuous reception (DRX) mode, transmitting first information to the terminal; wherein the first information is configured to instruct the terminal to determine, according to the first information, whether the terminal in an inactive time reports a channel state information (CSI) report; the first information is configured to indicate allowing the terminal in the inactive time to report the CSI report at a CSI report instant, or prohibiting the terminal in the inactive time from reporting a semi-persistent or aperiodic CSI report reported on a physical uplink shared channel (PUSCH) at the CSI report instant.

In a fifth aspect, one embodiment of the present disclosure provides a terminal, including: a processor, a memory, and a computer program stored on the memory and operable on the processor; wherein the computer program is executed by the processor to implement steps of the information reporting method in the first aspect.

In a sixth aspect, one embodiment of the present disclosure provides a network device, including: a processor, a memory, and a computer program stored on the memory and operable on the processor; wherein the computer program is executed by the processor to implement steps of the information reporting method in the second aspect.

In a seventh aspect, one embodiment of the present disclosure provides a computer readable storage medium, including: a computer program stored thereon; wherein the computer program is executed by a processor to implement steps of the above information reporting method.

In the embodiment of the present disclosure, when the terminal is in the DRX mode, the terminal determines, according to the first information, whether the terminal in the inactive time reports the CSI report, thereby defining reporting rules of CSI report for the terminal which is in the DRX mode and in the inactive time, and then improving communication efficiency and effectiveness.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings.

DETAILED DESCRIPTION

The technical solutions in embodiments of the present disclosure will be described hereinafter in a clear manner in conjunction with the drawings in the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

English abbreviations involved in various embodiments of the present disclosure are noted as follows.

Discontinuous reception (Discontinuous Reception, DRX);
User equipment (user equipment, UE);
Physical uplink control channel (Physical Uplink Control Channel, PUCCH)
Physical downlink control channel (Physical Downlink Control Channel, PDCCH);
Physical uplink shared channel (Physical Uplink Shared Channel, PUSCH);
Media access control (Media Access Control, MAC);
MAC control element (MAC Control Element, MAC CE);
Reference signal receiving power (Reference Signal Receiving Power, RSRP);
Radio resource control (Radio Resource Control, RRC);
Channel state information (Channel State Information, CSI);
CSI reference signals (CSI reference signals, CSI-RS);
CSI-RS resource index (CSI-RS Resource Index, CRI);
Synchronization signal block (Synchronization signal block, SSB) (SSB may also be referred to as SS block);
SSB resource index (SSB Resource Index, SSBRI)/(SSB-Index);
Precoding matrix indicator (Precoding Matrix Indicator, PMI);
Channel quality indicator (Channel Quality Indicator, CQI);
Rank indicator (Rank Indicator, RI);
Downlink control indicator (Downlink Control Indicator, DCI);
Machine to machine (Machine to Machine, M2M);
Enhance mobile broadband (Enhance Mobile Broadband, eMBB)
Ultra reliable & row ratency communication (Ultra Reliable & Row Ratency Communication, uRLLC);
Massive machine type communication (Massive Machine Type Communication, mMTC);
Transmission and reception point (Transmission and Reception Point, TRP);
Global system for mobile communication (Global System for Mobile Communication, GSM);
Code division multiple access (Code Division Multiple Access, CDMA);
Base transceiver station (Base Transceiver Station, BTS);
Wideband code division multiple access (Wideband Code Division Multiple access, WCDMA);
Cloud radio access network (Cloud Radio Access Network, CRAN);
Radio access network (Radio Access Network, RAN);
Personal communication service (Personal Communication Service, PCS);
Session initiation protocol (Session Initiation Protocol, SIP);
Wireless local loop (Wireless Local Loop, WLL);
Personal digital assistant (Personal Digital Assistant, PDA);
Graphics processing unit (Graphics Processing Unit, GPU);
Liquid crystal display (Liquid Crystal Display, LCD);
Organic light-emitting diode (Organic Light-Emitting Diode, OLED);
Read-only memory (Read-Only Memory, ROM);
Random access memory (Random Access Memory, RAM).

Some terms involved in the embodiments of the present disclosure are explained below to facilitate understanding:

1. CSI Report (CSI Report)

In the 5G NR system, the CSI report is mainly configured by a CSI report configuration message of high layer (RRC). The CSI report configuration message includes one DL BWP information corresponding to the CSI report, and a periodic characteristic of the CSI report. For example, the periodic characteristics of the CSI report mainly include three types: periodic (periodic, P), semi-persistent (semi-persistent, SP), and aperiodic (aperiodic, AP). For example, a terminal performs CSI measurement according to CSI-RS to obtain a CSI report. Generally, the CSI report include: CRI, RI, PMI, CQI and other information.

Based on the periodic characteristics of the foregoing three CSI report, some of current triggering/activation methods of the CSI reposting based on possible CSI-RS configurations may be as shown in the following Table 1.

TABLE 1

|  | Periodic CSI report (P-CSI report) | Semi-Persistent CSI report (SP-CSI report) | Aperiodic CSI report (AP-CSI report) |
|---|---|---|---|
| Periodic CSI-RS (P-CSI-RS) | When CSI report is transmitted by PUCCH, it will take effect after RRC configuration (including CSI report period and slot offset), without dynamic triggering/activation | When CSI report is transmitted by PUCCH, after RRC configuration (including CSI report period and slot offset), it needs to be activated by MAC CE to take effect When CSI report is transmitted by PUSCH, after RRC configuration (including CSI report period), it needs to be activated by DCI carried on PUSCH | After RRC configuration (including multiple candidate time offsets), it needs to be triggered by DCI carried on the PUSCH (the DCI indicates one of the time offsets) |
| Semi-Persistent CSI-RS (SP-CSI-RS) | Not supported | Same as above | Same as above |
| Aperiodic CSI-RS (AP-CSI-RS) | Not supported | Not supported | Same as above |

2. CSI Reference Resource

The CSI is derived according to the CSI reference resource (CSI reference resource), and includes CQI, RI, PMI, etc. The CSI reference resource specifies time-frequency resources used for deriving CSI carried in a CSI report, and some assumptions for deriving CSI, such as how to calculate various overheads, etc. The terminal needs to determine a slot of the CSI reference resource in a CSI report slot according to agreements.

3. DRX

The DRX mechanism can save power and increase endurance of a battery, and a basic mechanism thereof is: configuring a DRX cycle for the UE in the RRC connected state, and one DRX cycle includes an active time (Active Time) and an inactive time (i.e., outside the active time). For example, in the active time (i.e., when the UE needs to monitor the PDCCH), the UE monitors and receives the PDCCH; in the inactive time, the UE enters a sleep state, does not monitor the PDCCH to reduce power consumption of the UE, but may receive data or signals (e.g., PDSCH, ACK/NACK, RS, etc.) from other physical channels. For example, in downlink Semi-Persistent Scheduling (SPS), the UE in the inactive time may receive PDSCH data transmitted on periodically configured downlink subframes.

The active time in the DRX cycle includes the following timer running time: drx-onDuration Timer (drx-onduration timer), drx-Inactivity Timer (drx-inactivity timer), drx-Retransmission Timer DL (drx-Retransmission Timer DL), drx-Retransmission Timer UL (drx-Retransmission Timer UL) and ra-Contention Resolution Timer (drx-Contention Resolution Timer).

First example: when the UE receives a scheduling message (which is used to indicate an initial transmission) within the "On Duration" (i.e., during running period of the drx-onDuration Timer), the UE starts the "drx-Inactivity Timer" and monitors PDCCH in each downlink subframe during running period of the "drx-Inactivity Timer".

Second example: when the UE receives a scheduling message (which is used to indicate an initial PDCCH transmission) during running period of the "drx-Inactivity Timer", the UE resets the "drx-Inactivity Timer".

Third example: when the "drx-Inactivity Timer" expires or the UE receives DRX Command MAC CE, if the UE is not configured with a short DRX cycle, the UE directly uses a long DRX cycle; if the UE is configured with the short DRX cycle, the UE uses the short DRX cycle and starts (or resets) the "drx-ShortCycle Timer", and when the "drx-ShortCycle Timer" expires, the UE uses the long DRX cycle.

Fourth example: when performing downlink/uplink HARQ retransmission, the UE starts a timer drx-RetransmissionTimerDL/drx-RetransmissionTimerUL for the HARQ process (HARQ process). When the timer is in running period, the UE monitors PDCCH used for HARQ retransmission.

4. Rules in Related Art of CSI Report by UE in DRX Mode

Specifically, the protocols in the related art specify only the CSI report procedure by the UE in the active time.

First example: for PUCCH-based CSI report (including: P-CSI report, PUCCH-based SP-CSI report), a base station may configure whether to allow PUCCH-based CSI report by high-level parameter "cqi-Mask". Generally, if "cqi-Mask" is configured and "drx-onDuration Timer" is stopped, no PUCCH-based CSI report is performed; if "cqi-Mask" is not configured, and the MAC entity is not activated, no PUCCH-based CSI report is performed.

Second example: AP-CSI report is triggered by DCI scheduling. Thus, the AP-CSI report should be in a running period of the "drx-Inactivity Timer", and the CSI report is performed according to a situation that there is a scheduling message during the active time.

Third example: PUSCH-based SP-CSI report is activated by DCI, and the CSI report may be performed according to the current uplink semi-persistent scheduling.

However, since the UE in the inactive time may receive PDSCH data transmitted on periodically configured downlink subframes, then, when DCI scheduling information obtained by the UE in the active time by detecting PDCCH includes indication of obtaining MAC CE information in PDSCH, the UE obtains the MAC CE information in the PDSCH. At this point, the MAC CE for activation, can be used for PUCCH-based SP-CSI report, that is, in the inactive time or after the related timer ("drx-onDuration Timer" or a HARQ timer) is stopped, SP-CSI report can also be transmitted and the relevant timer can be started.

5. Other Terms

The term "and/or" in this context merely describes association relationship of associated objects, indicating that there may be three relationships, for example, A and/or B, means that there are three cases of including a single A, including a single B, and including both A and B. In addition, the character "/" in this context generally indicates an "or" relationship between an associated object before the character "/" and an associated object after the character "/"; in the formula, the character "/" indicates that there is a "division" relationship between an associated objects before the character "I" and an associated objects after the character "/". If not specified, "multiple" in this context means two or more.

In order to clearly describe technical solutions of the embodiments of the present disclosure, in the embodiments of the present disclosure, the terms such as "first" and "second" are used to distinguish same or similar items whose functions or effects are substantially the same. Those skilled in the art can understand that the terms such as "first" and "second" do not limit the number and order of execution.

It should be noted that, in the embodiments of the present disclosure, the terms such as "exemplary" or "for example" are used as examples, instances or illustrations. Any embodiment or design scheme described in the embodiments of the present disclosure as "exemplary" or "for example" should not be construed as being more preferred or advantageous than other embodiments or design scheme. Specifically, the terms such as "exemplary" or "for example" are intended to present concepts in a specific way.

The technical solutions provided in the present application are described hereinafter with reference to the accompanying drawings.

The technical solutions provided in the present disclosure may be applied to various communication systems, such as a 5G communication system, a future evolution system, or a fusion communication system. A variety of application scenarios may be included, such as M2M, D2M, macro-micro communication, eMBB, uRLLC, and mMTC. These scenarios include, but are not limited to, communication between terminals, or communication between network devices, or communication between the network device and the terminal. Embodiments of the present disclosure may be applied to communication between a network device and a terminal, communication between terminals, or communication between network devices in the 5G communication system, or communication between related devices in a subsequent evolved version of the communication system.

Figure 1:
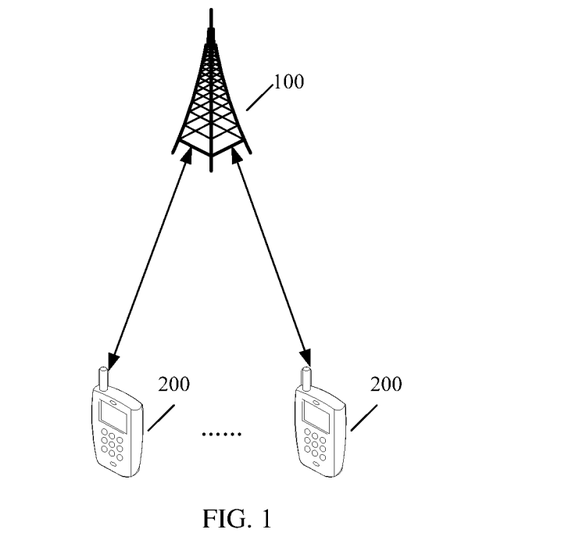
FIG. 1 is a possible schematic structural diagram of a communication system involved in an embodiment of the present disclosure.

FIG. 1 is a possible schematic structural diagram of a communication system involved in an embodiment of the present disclosure. As shown in FIG. 1, the communication system includes at least one network device 100 (only one is shown in FIG. 1) and one or more terminals 200 that are connected to each network device 100.

The foregoing network device 100 may be a base station, a core network device, a TRP, a relay station, or an access point. The network device 100 may be a BTS in the GSM or CDMA network, or an NB (NodeB) in the WCDMA, or an eNB or an eNodeB (evolutional NodeB) in the LTE. The network device 100 may also be a wireless controller in a CRAN scenario. The network device 100 may also be a network device in the 5G communication system or a network device in a future evolved network.

The terminal 200 may be a wireless terminal or a wired terminal. The wireless terminal may be a device that provides voice and/or other service data connectivity to the user, such as a handheld device with wireless communication capabilities, a computing device, or other processing device connected to a wireless modem, an in-vehicle device, a wearable device, a terminal in future 5G network, or a terminal in future evolved PLMN network. The wireless terminal may communicate with one or more core networks via RAN. The wireless terminal may be a mobile terminal, such as a mobile phone (or referred to as "cellular" phone) and a computer with a mobile terminal, for example, portable, pocket-sized, handheld, computer built-in or in-vehicle mobile devices that exchange language and/or data with a wireless access network, as well as a PCS phone, a cordless phone, a SIP phone, a WLL station, a PDA. The wireless terminals may also be a mobile device, a UE, a UE terminal, an access terminal, a wireless communication device, a terminal unit, a terminal station, a mobile station (Mobile Station), a mobile (Mobile), a remote station (Remote Station), a remote terminal (Remote Terminal), a subscriber unit (Subscriber Unit), a subscriber station (Subscriber Station), a User Agent (User Agent), a terminal device, etc. As an example, in the embodiment of the present disclosure, FIG. 1 shows that the terminal is a mobile phone as an example.

First Embodiment

Figure 2:
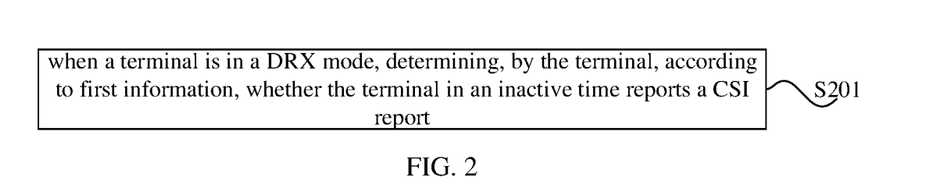
FIG. 2 is a first schematic flow chart of an information reporting method according to an embodiment of the present disclosure.

FIG. 2 is a schematic flow chart of an information reporting method according to an embodiment of the present disclosure. As shown in FIG. 2, the information reporting method may include the following steps.

S201: when a terminal is in a DRX mode, determining, by the terminal, according to first information, whether the terminal in an inactive time reports a CSI report.

Optionally, in one embodiment of the present disclosure, the foregoing first information may be predefined, i.e., specified in agreements.

Optionally, in one embodiment of the present disclosure, the foregoing first information may be configured by a network device for the terminal.

Figure 3:
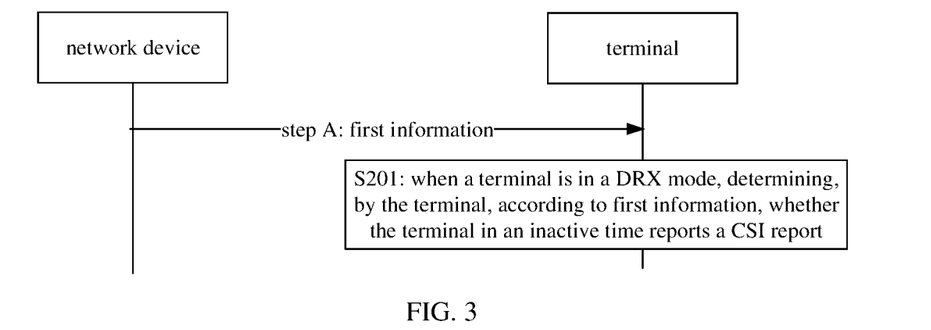
FIG. 3 is a second schematic flow chart of an information reporting method according to an embodiment of the present disclosure.

Exemplarily, as shown in FIG. 3, before the step S201, one embodiment of the present disclosure further includes the following step A.

Step A: receiving, by the terminal, the first information transmitted by the network device.

Correspondingly, the peer network device transmits the first information.

Further optionally, in one embodiment of the present disclosure, the first information is carried in RRC signaling, MAC CE or DCI.

The network device in one embodiment of the present disclosure may be a network device in the communication system shown in FIG. 1, for example, a base station; the terminal in one embodiment of the present disclosure may be a terminal device in the communication system shown in FIG. 1.

In one embodiment of the present disclosure, the foregoing first information is configured to indicate allowing the terminal in the inactive time to report CSI report at a CSI report instant, or prohibiting the terminal in the inactive time from reporting the CSI report at the CSI report instant.

In one embodiment of the present disclosure, when the foregoing first information is configured to indicate allowing the terminal in the inactive time to report CSI report at the CSI report instant, in the DRX mode, regardless of whether the terminal is in the active time or the inactive time, the terminal reports the CSI report at the CSI report instant.

In one embodiment of the present disclosure, when the foregoing first information is configured to indicate prohibiting the terminal in the inactive time from reporting the CSI report at the CSI report instant, in the DRX mode, the terminal does not report CSI report at the CSI report instant as long as the terminal is in the inactive time. In an example, when the terminal in the DRX mode needs to further save power, the terminal may configure the first information by itself to instruct the terminal to prohibit the terminal in the inactive time from reporting the CSI report at the CSI report instant.

Optionally, in one embodiment of the present disclosure, the foregoing first information is configured to indicate allowing the terminal in the inactive time to report at the CSI report instant at least one of the following: periodic CSI report reported on PUCCH, semi-persistent CSI report reported on PUCCH, semi-persistent CSI report reported on PUSCH, and aperiodic CSI report reported on PUSCH.

Optionally, in one embodiment of the present disclosure, the foregoing first information is configured to indicate prohibiting the terminal in the inactive time from reporting at the CSI report instant at least one of the following: periodic CSI report reported on PUCCH, semi-persistent CSI report reported on PUCCH, semi-persistent CSI report reported on PUSCH, and aperiodic CSI report reported on PUSCH.

Optionally, in a possible implementation manner, in the DRX mode, the terminal in the inactive time may further determine whether a present CSI report needs to be reported by comparing the present CSI report with a previous CSI report, thereby further saving power. At this point, regardless of whether the terminal reports the present CSI report or whether the terminal is in the active time, the network device needs to perform detection on time.

Exemplarily, in one embodiment of the present disclosure, before the step S201, the method further include following step B1.

Step B1: obtaining, by the terminal, a first CSI report and a second CSI report.

The foregoing second CSI report is a previous CSI report of the first CSI report.

On the basis of the step B1, S201 specifically includes the following step B2.

Step B2: when the first information is configured to indicate allowing the terminal in the inactive time to report the CSI report at the CSI report instant, determining, by the terminal, according to the first CSI report and the second CSI report, whether the terminal in the inactive time reports a part or all of the first CSI report.

In one embodiment of the present disclosure, when the first CSI report is the same as the second CSI report, the terminal determines that the terminal in the inactive time does not report the first CSI report. When the first CSI report is different from the second CSI report, the terminal determines that the terminal in the inactive time reports the first CSI report or reports contents in the first CSI report that are different from the second CSI report.

The scenario (i.e., the combination of step B1 and step B2) is further extended for the scenario in which the content of the CSI report is beam information (i.e., L1-RSRP report).

The foregoing scheme (i.e., the scheme formed by combining the step B1 and the step B2) will be further expanded for the scenario where the content of the CSI report includes beam information (e.g., L1-RSRP report).

Further optionally, when both of the content of the foregoing first CSI report and the content of the second CSI report are beam information, the foregoing first CSI report includes: at least one first resource index, or at least one first resource index and a first RSRP corresponding to each first resource index, where one first resource index is corresponding to one first RSRP; the foregoing second CSI report at least includes: at least one second resource index, or at least one second resource index and a second RSRP corresponding to each second resource index, where one second resource index is corresponding to one second RSRP. The first resource index and the second resource index include: CRI or SSBRI (or SSB-Index).

In one embodiment of the present disclosure, the step B2 specifically includes the following steps B21 or B22:

Step B21: when the at least one first resource index is different from the at least one second resource index, determining, by the terminal, that the terminal in the inactive time reports part or all of the first CSI report.

In one embodiment of the present disclosure, when the first resource index in the first CSI report is different from the second resource index in the second CSI report, it indicates that the terminal in the inactive time needs to report at least the first resource index in the first CSI report. That is, the terminal determines that the terminal in the inactive time may choose to report the first CSI report, or the first resource index in the first CSI report, or the first resource index in the first CSI report and the first RSRP corresponding to each first resource index.

Step B22: when the at least one first resource index is the same as the at least one second resource index, if a difference between the first RSRP corresponding to any first resource index and the second RSRP corresponding to the second resource index which is the same as the any first resource index, is greater than or equal to a preset threshold, determining, by the terminal, that the terminal in the inactive time reports part or all of the first CSI report.

In one embodiment of the present disclosure, when the first resource index in the first CSI report is the same as the second resource index in the second CSI report, then any resource index is corresponding to one first RSRP in the first CSI report and one second RSRP in the second CSI report, respectively. When the first RSRP and the second RSRP corresponding to any resource index are different or a difference between the first RSRP and the second RSRP corresponding to any resource index is greater than a certain error threshold (i.e., the preset threshold), it indicates that the terminal in the inactive time at least needs to report the first RSRP corresponding to the any resource index or the difference between the first RSRP and the second RSRP corresponding to the any resource index. That is, the terminal determines that the terminal in the inactive time reports the first CSI report, or the first RSRP corresponding to the any resource index, or the difference between the first RSRP and the second RSRP corresponding to the any resource index, or the any resource index and the first RSRP corresponding to the any resource index, or the any resource index and the difference between the first RSRP and the second RSRP corresponding to the any resource index.

Further optionally, when the foregoing first CSI report and the second CSI report are both CSI report corresponding to one beam, that is, the first CSI report and the second CSI report are obtained by the terminal performing beam measurement on one beam. Based on this, in one embodiment of the present disclosure, the step B2 specifically includes the following step B23.

Step B23: when the difference between the first RSRP in the first CSI report and the second RSRP in the second CSI report is greater than or equal to the preset threshold, determining, by the terminal, that the terminal in the inactive time reports the first RSRP.

In the information reporting method provided in the embodiment of the present disclosure, when the terminal is in the DRX mode, the terminal determines, according to the first information, whether the terminal in the inactive time reports the CSI report, thereby defining reporting rules of CSI report for the terminal which is in the DRX mode and in the inactive time, and then improving communication efficiency and effectiveness.

Second Embodiment

Figure 4:
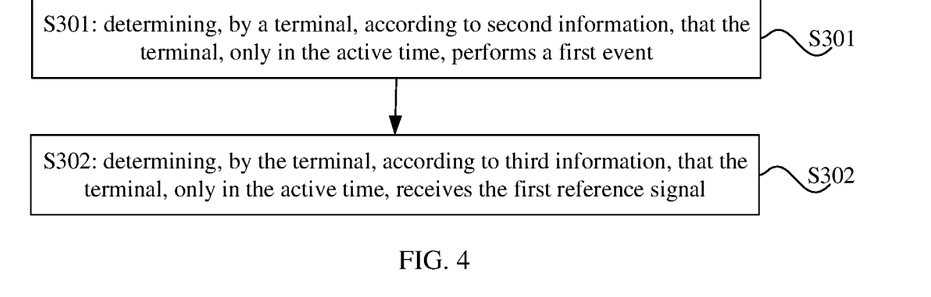
FIG. 4 is a third schematic flow chart of an information reporting method according to an embodiment of the present disclosure.

FIG. 4 is a schematic flow chart of an information reporting method according to an embodiment of the present disclosure. The solution provided in this embodiment restricts a terminal to perform beam measurement and/or CSI measurement only in the active time, thereby saving power for the terminal in the DRX mode. Exemplarily, the information reporting method includes S301 and/or S302, and FIG. 4 shows S301 and S302 as an example.

S301: determining, by a terminal, according to second information, that the terminal, only in the active time, performs a first event.

In one embodiment of the present disclosure, the foregoing second information is configured to indicate that the terminal, only in the active time, performs the first event. The foregoing first event includes beam measurement and/or CSI measurement.

Optionally, in one embodiment of the present disclosure, when the terminal is in a power saving mode, the terminal determines, according to the second information, that the terminal, only in the active time, performs the first event.

Exemplarily, the terminal may determine by itself when to enter the power saving mode (for example, the terminal automatically enters the power saving mode when the terminal is in a low battery state), or may enter the power saving mode according to instruction of the network device (for example, a base station transmits instruction information to the terminal via signaling to instruct the terminal to enter the power saving mode), which are not limited herein.

Optionally, in one embodiment of the present disclosure, the foregoing second information may be predefined, i.e., specified by the agreements.

Optionally, in one embodiment of the present disclosure, the foregoing second information is configured by the network device for the terminal.

Figure 5:
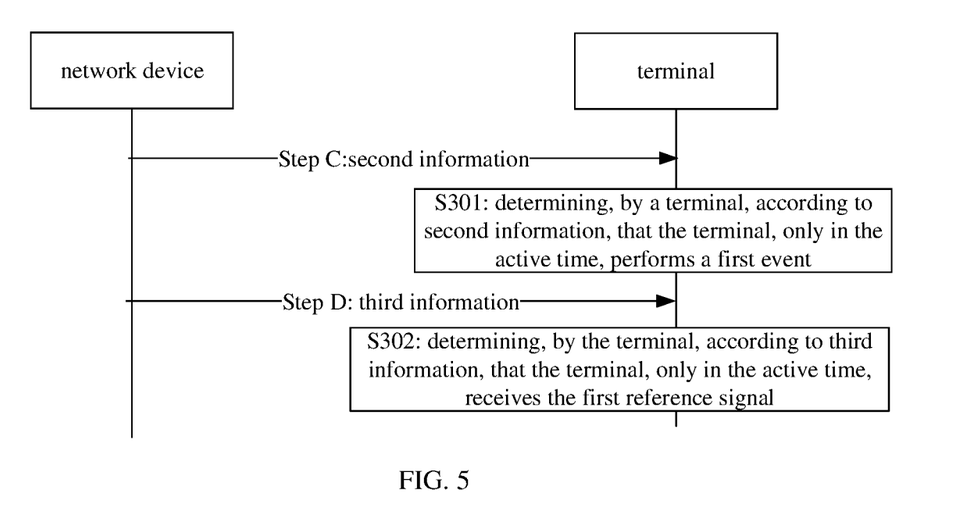
FIG. 5 is a fourth schematic flow chart of an information reporting method according to an embodiment of the present disclosure.

Exemplarily, as shown in FIG. 5, before S301, one embodiment of the present disclosure further includes the following step C.

Step C: receiving, by the terminal, the second information transmitted by the network device.

Correspondingly, the peer network device transmits the second information.

Further optionally, in one embodiment of the present disclosure, the second information is carried in RRC signaling, MAC CE or DCI.

Optionally, in one embodiment of the present disclosure, the foregoing second information is indicated by at least one of the following conditions:

First condition: CSI reference resource used by the terminal in performing the first event is in an active time, in other words, valid downlink slot (valid downlink slot) of the CSI reference resource is in an active time;

Second condition: the terminal receives a first reference signal at least once no later than the CSI reference resource, and correspondingly, the network device transmits the first reference signal at least once no later than the CSI reference resource.

The foregoing first reference signal includes at least one of the following: CSI-RS for channel measurement, CSI-RS for interference measurement, CSI-IM for interference measurement, CSI-RS or SSB for RSRP measurement. The foregoing first reference signal is in an active time, and the CSI reference resource in the second condition may be in an active time or an inactive time, which is not limited herein.

It should be noted that, when the first condition and the second condition are simultaneously satisfied, the CSI reference resource and the first reference signal may be in the same active time, or may be in different active time, and the first reference signal is no later than the CSI reference resource.

S302: determining, by the terminal, according to third information, that the terminal, only in the active time, receives the first reference signal.

Correspondingly, the peer network device transmits the first reference signal.

In one embodiment of the present disclosure, the foregoing third information is configured to indicate that the terminal, only in the active time, receives the first reference signal.

Optionally, in one embodiment of the present disclosure, the network device transmits, only in the active time, the first reference signal to the terminal. Exemplarily, the embodiment of the present disclosure limits the time when the first reference signal is transmitted, so that the terminal, only in the active time, receives the first reference signal, thereby achieving the purpose of further power saving.

Optionally, in one embodiment of the present disclosure, when the terminal is in a power saving mode, the terminal determines, according to the third information, that the terminal, only in the active time, performs the first event.

Exemplarily, the terminal may determine by itself when to enter the power saving mode (for example, the terminal automatically enters the power saving mode when the terminal is in a low battery state), or may enter the power saving mode according to instruction of the network device (for example, a base station transmits instruction information to the terminal via signaling to instruct the terminal to enter the power saving mode), which are not limited herein.

Optionally, in one embodiment of the present disclosure, the foregoing third information may be predefined, i.e., specified by the agreements.

Optionally, in one embodiment of the present disclosure, the foregoing third information is configured by the network device for the terminal.

Exemplarily, as shown in FIG. 5, before S302, one embodiment of the present disclosure further includes the following step D.

Step D: receiving, by the terminal, the third information transmitted by the network device.

Correspondingly, the peer network device transmits the third information.

Further optionally, in one embodiment of the present disclosure, the third information is carried in RRC signaling, MAC CE or DCI.

It should be noted that S301 and S302 in one embodiment of the present disclosure do not indicate sequence of steps, S302 may be implemented before S301 or after S301, or S301 and S302 may also be implemented simultaneously, which is not limited here. The numbers of S301 and S302 in the embodiment of the present disclosure merely distinguish the steps.

It should be noted that the solution provided in the second embodiment may be used as an independent solution, or may be combined with the solution provided in the first embodiment, which is not limited herein.

The information reporting method provided in the embodiment of the present disclosure restricts the terminal, only in the active time, to perform beam measurement and/or CSI measurement and/or receive the reference signal, thereby achieving the purpose of further saving power for the terminal in the DRX mode.

Third Embodiment

Figure 6:
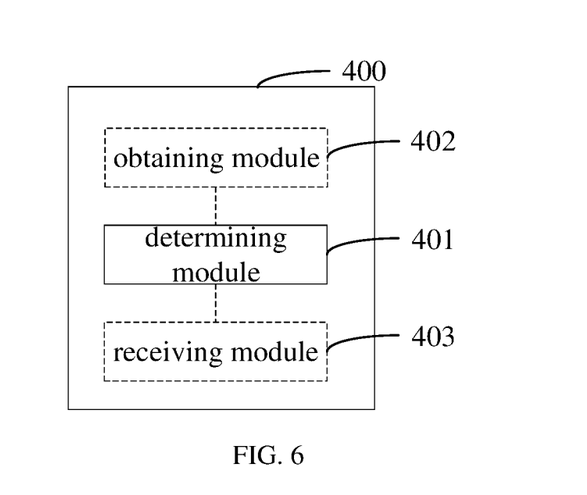
FIG. 6 is a first schematic structural diagram of a terminal according to an embodiment of the present disclosure.

As shown in FIG. 6, one embodiment of the present disclosure provides a terminal 400. The terminal 400 includes a determining module 401.

The determining module 401 is configured to, when the terminal is in a DRX mode, determine, according to first information, whether the terminal in an inactive time reports a CSI report; where the first information is configured to indicate allowing the terminal in the inactive time to report CSI report at a CSI report instant, or prohibiting the terminal in the inactive time from reporting the CSI report at the CSI report instant.

Optionally, the foregoing first information is configured to indicate allowing the terminal in the inactive time to report at the CSI report instant at least one of the following: periodic CSI report reported on PUCCH, semi-persistent CSI report reported on PUCCH, semi-persistent CSI report reported on PUSCH, and aperiodic CSI report reported on PUSCH.

Optionally, as shown in FIG. 6, the terminal 400 further includes: an obtaining module 402.

The obtaining module 402 is configured to obtain a first CSI report and a second CSI report; where the second CSI report is a previous CSI report of the first CSI report. The determining module 401 is specifically configured to, when the first information is configured to indicate allowing the terminal in the inactive time to report the CSI report at the CSI report instant, determine, according to the first CSI report and the second CSI report obtained by the obtaining module 402, whether the terminal in the inactive time reports a part or all of the first CSI report.

Further optionally, the foregoing first CSI report includes at least one first resource index; the foregoing second CSI report includes at least one second resource index. The first resource index and the second resource index include: a channel state information reference signal resource index or SSB-Index. The determining module 401 is specifically configured to, when the at least one first resource index is different from the at least one second resource index, determine that the terminal in the inactive time reports part or all of the first CSI report.

Further optionally, the foregoing first CSI report includes: at least one first resource index and a first RSRP corresponding to each first resource index; the foregoing second CSI report includes: at least one second resource index and a second RSRP corresponding to each second resource index. The first resource index and the second resource index include: CRI or SSBRI (or SSB-Index). The determining module 401 is specifically configured to, when the at least one first resource index is the same as the at least one second resource index, if a difference between the first RSRP corresponding to any first resource index and the second RSRP corresponding to the second resource index which is the same as the any first resource index, is greater than or equal to a preset threshold, determine that the terminal in the inactive time reports part or all of the first CSI report.

Optionally, the first information is predefined.

Optionally, as shown in FIG. 6, the terminal 400 further includes a receiving module 403.

The receiving module 403 is configured to receive the first information transmitted by the network device.

Optionally, the determining module 401 is further configured to determine, according to second information, that the terminal, only in the active time, performs a first event; where the second information is configured to indicate that the terminal, only in the active time, performs the first event. The first event includes beam measurement and/or CSI measurement.

Optionally, the second information is predefined.

Optionally, the receiving module 403 is configured to receive the second information transmitted by the network device.

Optionally, the determining module 401 is further configured to, determine, according to third information, that the terminal, only in the active time, receives the first reference signal. The third information is configured to indicate that the terminal, only in the active time, receives the first reference signal. The first reference signal includes at least one of the following: CSI-RS for channel measurement, CSI-RS for interference measurement, CSI-IM for interference measurement, CSI-RS or SSB for RSRP measurement.

Optionally, the third information is predefined.

Optionally, the receiving module 403 is further configured to receive the third information transmitted by the network device.

Optionally, the foregoing second information is indicated by at least one of the following conditions:

First condition: CSI reference resource used by the terminal in performing the first event is in an active time, Second condition: the terminal receives a first reference signal at least once no later than the CSI reference resource; where the first reference signal includes at least one of the following: CSI-RS for channel measurement, CSI-RS for interference measurement, CSI-IM for interference measurement, CSI-RS or SSB for RSRP measurement. The first reference signal is in an active time.

According to the terminal provided in the embodiment of the present disclosure, when the terminal is in the DRX mode, the terminal determines, according to the first information, whether the terminal in the inactive time reports the CSI report, thereby defining reporting rules of CSI report for the terminal which is in the DRX mode and in the inactive time, and then improving communication efficiency and effectiveness.

The terminal provided in the embodiment of the present disclosure can implement the process shown in any one of the foregoing method embodiments in FIG. 2 to FIG. 5, and details are not described herein again.

Fourth Embodiment

Figure 7:
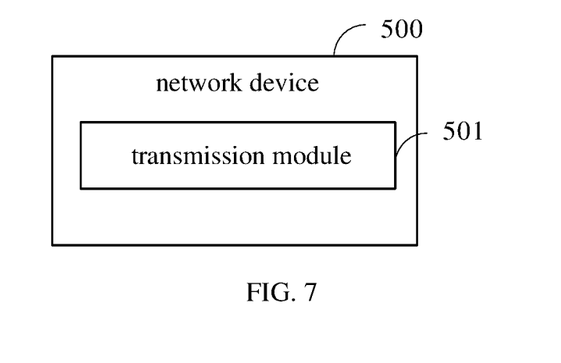
FIG. 7 is a first schematic structural diagram of a network device according to an embodiment of the present disclosure.

FIG. 7 is a schematic diagram of a hardware structure of a network device that implements embodiments of the present disclosure. The network device 500 includes a transmission module 501.

The transmission module 501 is configured to, when a terminal is in the DRX mode, transmit first information to the terminal; where the first information is configured to instruct the terminal to determine, according to the first information, whether the terminal in the inactive time reports CSI report; the first information is configured to indicate allowing the terminal in the inactive time to report CSI report at a CSI report instant, or prohibiting the terminal in the inactive time from reporting semi-persistent or aperiodic CSI report reported on PUSCH at the CSI report instant.

Optionally, the transmission module 501 is further configured to transmit second information to the terminal, where the second information is configured to instruct the terminal to determine, according to the second information, that the terminal, only in the active time, performs a first event. The second information is configured to indicate that the terminal, only in the active time, performs the first event. The first event includes beam measurement and/or CSI measurement.

Optionally, the transmission module 501 is further configured to transmit third information to the terminal, where the third information is configured to instruct the terminal to determine, according to the third information, that the terminal, only in the active time, receives a first reference signal. The third information is configured to indicate that the terminal, only in the active time, receives the first reference signal. The first reference signal includes at least one of the following: CSI-RS for channel measurement, CSI-RS for interference measurement, CSI-IM for interference measurement, and CSI-RS or SSB for RSRP measurement.

Optionally, the transmission module 501 is further configured to, only in the active time, transmit the first reference signal to the terminal.

Optionally, the second information is indicated by at least one of the following conditions:

First condition: CSI reference resource used by the terminal in performing the first event is in an active time;

Second condition: the network device transmits the first reference signal at least once no later than the CSI reference resource; the first reference signal includes at least one of the following: CSI-RS for channel measurement, CSI-RS for interference measurement, CSI-IM for interference measurement, CSI-RS or SSB for RSRP measurement; the first reference signal is in the active time.

According to the network device provided in one embodiment of the present disclosure, when the terminal is in the DRX mode, the network device transmits first information to the terminal, to instruct the terminal to determine, according to the first information, whether the terminal in the inactive time reports the CSI report, thereby defining reporting rules of CSI report for the terminal which is in the DRX mode and in the inactive time, and then improving communication efficiency and effectiveness.

The network device provided in the embodiment of the present disclosure can implement the process shown in any one of the foregoing method embodiments in FIG. 2 to FIG. 5, and details are not described herein again.

Fifth Embodiment

Figure 8:
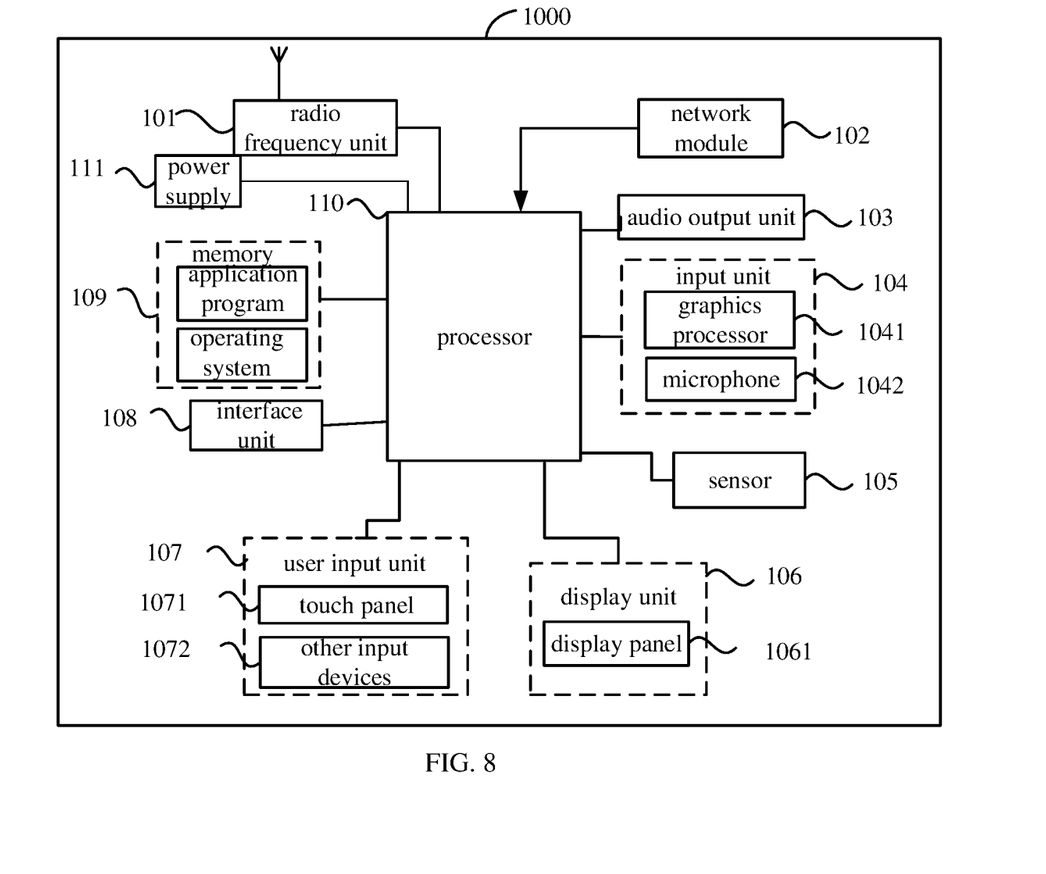
FIG. 8 is a second schematic structural diagram of a terminal according to an embodiment of the present disclosure.

FIG. 8 is a schematic diagram of a hardware structure of a terminal implementing various embodiments of the present disclosure. The terminal 1000 includes, but is not limited to, a radio frequency unit 101, a network module 102, an audio output unit 103, an input unit 104, a sensor 105, a display unit 106, a user input unit 107, an interface unit 108, a memory 109, a processor 110, and a power supply 111. It will be appreciated by those skilled in the art that structures of the terminal 1000 shown in FIG. 8 do not constitute a limitation of a terminal, which may include more or fewer components than illustrated, or have some components combined, or different component arrangements. In one embodiment of the present disclosure, the terminal 1000 includes, but is not limited to, a mobile phone, a tablet computer, a notebook computer, a palmtop computer, an in-vehicle terminal, a wearable device, a pedometer, and the like.

The processor 110 is configured to, when the terminal is in a DRX mode, determine, according to first information, whether the terminal in an inactive time reports a CSI report; where the first information is configured to indicate allowing the terminal in the inactive time to report CSI report at a CSI report instant, or prohibiting the terminal in the inactive time from reporting semi-persistent or aperiodic CSI report reported on PUSCH at the CSI report instant.

According to the terminal provided in the embodiment of the present disclosure, when the terminal is in the DRX mode, the terminal determines, according to the first information, whether the terminal in the inactive time reports the CSI report, thereby defining reporting rules of CSI report for the terminal which is in the DRX mode and in the inactive time, and then improving communication efficiency and effectiveness.

It should be understood that in some embodiments of the present disclosure, the radio frequency unit 101 may be used to receive and transmit signals during receiving and transmitting information or a call. Specifically, the radio frequency unit 101 receives downlink data from a base station and then transmits the downlink data to the processor 110 for processing. Uplink data is transmitted to the base station. Generally, the radio frequency unit 101 includes, but is not limited to, an antenna, at least one amplifier, a transceiver, a coupler, a low noise amplifier, a duplexer, and the like. In addition, the radio frequency unit 101 may also communicate with the network and other devices through a wireless communication system.

The terminal 1000 provides wireless broadband internet access to the user through the network module 102, such as assisting the user in receiving and transmitting email, browsing web pages, and accessing streaming media.

The audio output unit 103 may convert the audio data received by the radio frequency unit 101 or the network module 102 or stored in the memory 109 into an audio signal and output as sound. Moreover, the audio output unit 103 may also provide audio output (e.g., call signal reception sound, message reception sound, etc.) related to a specific function performed by the terminal 1000. The audio output unit 103 includes a speaker, a buzzer, a receiver, and the like.

The input unit 104 is used for receiving an audio or video signal. The input unit 104 may include a GPU 1041 and a microphone 1042. The GPU 1041 processes image data of static pictures or videos obtained by an image capturing apparatus (such as a camera) in a video capturing mode or an image capturing mode. The processed image frame may be displayed on the display unit 106. The image frames processed by the graphics processor 1041 may be stored in the memory 109 (or other storage medium) or transmitted via the radio frequency unit 101 or the network module 102. The microphone 1042 can receive sound and can process such sound into audio data. The processed audio data may be converted into a format output that may be transmitted to the mobile communication base station via the radio frequency unit 101 in the case of a telephone talk mode.

The terminal 1000 further includes at least one sensor 105, such as a light sensor, a motion sensor, and other sensors. Specifically, the light sensor includes an ambient light sensor and a proximity sensor. The ambient light sensor can adjust brightness of a display panel 1061 according to the brightness of the ambient light. The proximity sensor can turn off the display panel 1061 and/or backlight when the terminal 1000 moves to the ear. As one of the motion sensors, an accelerometer sensor can detect the magnitude of the acceleration in each direction (generally three axes), can detect the magnitude and direction of the gravity when stationary, and can be used to identify the attitude of the terminal (such as horizontal/vertical screen switching, related games, magnetometer attitude calibration), vibration identification related functions (such as pedometer, knocking), and the like. The sensor 105 may further include a fingerprint sensor, a pressure sensor, an iris sensor, a molecular sensor, a gyroscope, a barometer, a hygrometer, a thermometer, an infrared sensor, and the like, which will not be elaborated herein.

The display unit 106 is used to display information input by or provided to the user. The display unit 106 may include a display panel 1061, which may be configured in the form of a liquid crystal display (Liquid Crystal Display, LCD), an organic light-emitting diode (Organic Light-Emitting Diode, OLED), or the like.

The user input unit 107 may be used to receive the input number or character information, and to generate a key signal input related to the user setting and the function control of the terminal 1000. Specifically, the user input unit 107 includes a touch panel 1071 and other input devices 1072. The touch panel 1071, also referred to as a touch screen, may collect touch operations on or near the touch panel (e.g., operations on or near the touch panel 1071 using any suitable object or accessory, such as a finger, stylus, or the like). The touch panel 1071 may include a touch detection device and a touch controller. The touch detection device detects a touch orientation of the user, detects a signal generated by the touch operation, and transmits the signal to the touch controller. The touch controller receives touch information from the touch detection device and converts it into contact coordinates, which are then transmitted to the processor 110, receives commands from the processor 110 and execute them. In addition, the touch panel 1071 may be implemented in various types such as a resistive type, a capacitive type, an infrared ray, and a surface acoustic wave. In addition to the touch panel 1071, the user input unit 107 may further include other input devices 1072. Specifically, other input devices 1072 may include, but are not limited to, a physical keyboard, a function key (such as a volume control key, an on-off key), a trackball, a mouse, and a joystick, which will not be elaborated herein.

Further, the touch panel 1071 may be overlaid on the display panel 1061. When the touch panel 1071 detects a touch operation on or near the touch panel, the touch panel 1071 transmits it to the processor 110 to determine a type of a touch event. Then, the processor 110 provides a corresponding visual output on the display panel 1061 according to the type of the touch event. Although in FIG. 8, the touch panel 1071 and the display panel 1061 are implemented as two separate components to implement the input and output functions of the terminal 1000, in some embodiments, the touch panel 1071 and the display panel 1061 may be integrated to implement the input and output functions of the terminal 1000, which are not specifically limited herein.

The interface unit 108 is an interface through which an external device is connected to the terminal 1000. For example, the external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 108 may be used to receive input (e.g., data information, power, etc.) from the external device and transmit the received input to one or more elements within the terminal 1000 or may be used to transmit data between the terminal 1000 and the external device.

The memory 109 may be used to store software programs and various data. The memory 109 may mainly include a program storage area and a data storage area. The program storage area may store an operating system, an application program (such as a sound play function, an image play function) required by at least one function, and the like. The data storage area may store data (such as audio data, a phone book) created according to use of the terminal. In addition, the memory 109 may include high speed random access memory, and may also include non-volatile memory, such as at least one magnetic disk storage device, flash memory device, or other volatile solid state storage device.

The processor 110 is a control center of the terminal 1000, connects various parts of the entire terminal 1000 by various interfaces and lines, executes various functions of the terminal 1000 and processes data by running or executing software programs and/or modules stored in the memory 109 and invoking data stored in the memory 109, thereby performing overall monitoring of the terminal 1000. The processor 110 may include one or more processing units. Optionally, the processor 110 may integrate an application processor and a modem processor. The application processor primarily processes the operating system, the user interface and the application program. The modem processor primarily processes wireless communications. It will be appreciated that the modem processor may also not be integrated into the processor 110.

The terminal 1000 may further include a power source 1011 (such as a battery) that supplies power to the various components. Optionally, the power source 111 may be logically connected to the processor 110 through a power management system to perform functions such as managing charging, discharging, and power consumption management through the power management system.

In addition, the terminal 1000 includes functional modules not shown, which will not be elaborated herein.

Sixth Embodiment

Figure 9:
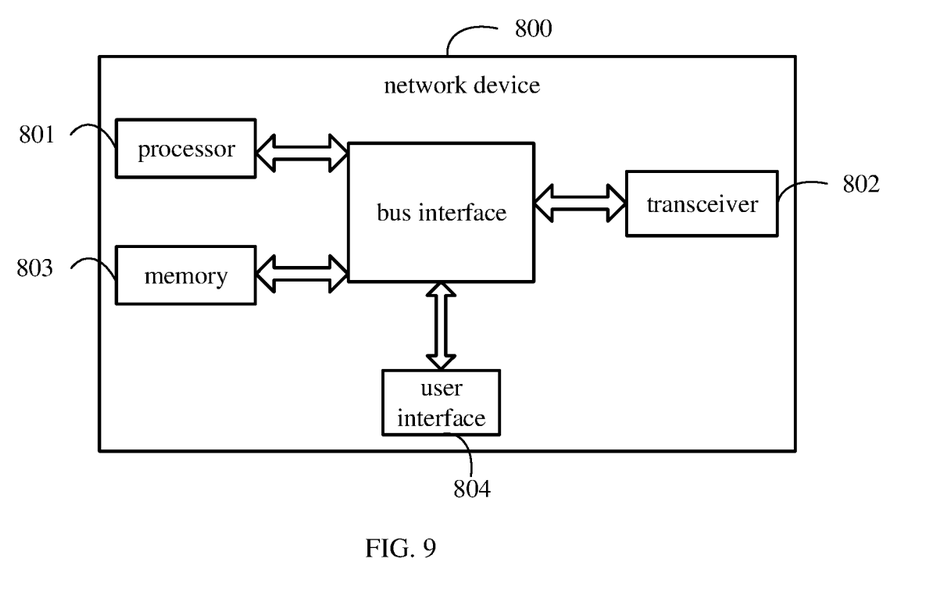
FIG. 9 is a second schematic structural diagram of a network device according to an embodiment of the present disclosure.

FIG. 9 is a schematic diagram of a hardware structure of a network device that implements various embodiments of the present disclosure. The network device 800 includes: a processor 801, a transceiver 802, a memory 803 and a bus interface.

The transceiver 802 is configured to, when a terminal is in the DRX mode, transmit first information to the terminal; where the first information is configured to instruct the terminal to determine, according to the first information, whether the terminal in the inactive time reports CSI report; the first information is configured to indicate allowing the terminal in the inactive time to report CSI report at a CSI report instant, or prohibiting the terminal in the inactive time from reporting semi-persistent or aperiodic CSI report reported on PUSCH at the CSI report instant.

According to the network device provided in one embodiment of the present disclosure, when the terminal is in the DRX mode, the network device transmits first information to the terminal, to instruct the terminal to determine, according to the first information, whether the terminal in the inactive time reports the CSI report, thereby defining reporting rules of CSI report for the terminal which is in the DRX mode and in the inactive time, and then improving communication efficiency and effectiveness.

In one embodiment of the present disclosure, as shown in FIG. 9, the bus architecture may include any number of interconnected buses and bridges. Various circuits of one or more processors, which are represented by the processor 801, and one or more memories, which are represented by the memory 803, are linked together. The bus architecture may link various other circuits, such as a peripheral device, voltage regulator and a power management circuit together. These features are well known in this field, therefore, this disclosure does not further describe on these features. The bus interface provides an interface. The transceiver 802 may be multiple elements, including a transmitter and a receiver and provide units, which communicate with other devices on a transmission medium. For different user equipment, the user interface 804 may also be an interface that can be connected externally and internally with a required device. The connected device includes, but is not limited to, a keyboard, a monitor, a speaker, a microphone, joystick, etc. The processor 801 is responsible for managing the bus architecture and the normal processing. The memory 803 may be used to store data used by the processor 801 when performing operations.

In addition, the network device 800 further includes some functional modules not shown, which are not described herein again.

Seventh Embodiment

Optionally, one embodiment of the present disclosure further provides a terminal, including a processor, a memory, a computer program stored on the memory and executable on the processor. The computer program is executed by the processor to implement process of the information reporting method in the foregoing first embodiment with the same technical effect achieved. To avoid repetition, details are not described herein.

Optionally, one embodiment of the present disclosure further provides a network device, including a processor, a memory, a computer program stored on the memory and executable on the processor. The computer program is executed by the processor to implement process of the information reporting method in the foregoing first embodiment with the same technical effect achieved. To avoid repetition, details are not described herein.

One embodiment of the present disclosure further provides a computer readable storage medium. The computer readable storage medium stores a computer program. The computer program is executed by a processor to implement process of the information reporting method in the foregoing embodiment with the same technical effect achieved. To avoid repetition, details are not described herein. The computer readable storage medium, may be, for example, a ROM, a RAM, a magnetic disk, or an optical disk.

It is to be understood that the terms such as "include" and "comprises" or their variations used in the specification are intended to encompass a non-exclusive inclusion, such that a process, method, article or device that include a series of elements include not only those elements but also other elements that are not explicitly listed, or elements that are inherent to such process, method, article, or device. Without more restrictions, an element defined by the sentence "including a . . . " does not exclude existence of other identical element in the process, method, article or device that includes the element.

Through the description of the above embodiments, those skilled in the art can clearly understand that the foregoing embodiment method can be implemented by means of software plus a necessary general hardware platform, and, can also be through hardware, but in many cases, the former is better. Based on such understanding, the technical solution of the present disclosure essentially or the part that contributes to the prior art may be embodied in the form of a software product. A computer software product is stored in a storage medium (such as ROM/RAM, magnetic disk, optical disk), including several instructions to enable a terminal (which may be a mobile phone, a computer, a server, or a network device, etc.) to execute the method described in each embodiment of the present disclosure.

The embodiments of the present disclosure have been described above with reference to the drawings, but the present disclosure is not limited to the foregoing specific embodiments. The foregoing specific embodiments are merely illustrative and not restrictive. In the light of the present disclosure, those skilled in the art may make many variations without departing from the sprit and the protection scope of the claims, which fall within the protection of the present disclosure.

What is claimed is:

1. An information reporting method, performed by a user equipment (UE), comprising:
   in response to that a discontinuous reception (DRX) mode is configured, reporting, by the UE, a channel state information (CSI) report only in response to receiving at least one first reference signal in DRX active time no later than a CSI reference resource;
   wherein before reporting, by the UE, a channel state information (CSI) report only in response to receiving at least one first reference signal in DRX active time no later than a CSI reference resource, the method further comprises:
   obtaining a first CSI report and a second CSI report; wherein the second CSI report is a previous CSI report of the first CSI report;
   wherein the reporting, by the UE, a channel state information (CSI) report only in response to receiving at least one first reference signal in DRX active time no later than a CSI reference resource, comprises:
   when indicating by first information, allowing the UE in the DRX inactive time to report the CSI report at a CSI report instant, determining, according to the first CSI report and the second CSI report, whether the UE in the DRX inactive time reports a part or all of the first CSI report.

2. The method according to claim 1, wherein the first reference signal comprises at least one of the following: CSI reference signals (CSI-RS) for channel measurement, CSI-RS for interference measurement, CSI-interference measurement (IM) for interference measurement, CSI reference signals (CSI-RS) or synchronization signal block (SSB) for reference signal receiving power (RSRP) measurement.

3. The method according to claim 1, wherein the method further comprises: measuring the first reference signal to obtain the CSI report, wherein the first reference signal is measured in an active period.

4. The method according to claim 1, wherein the first CSI report comprises at least one first resource index; the second CSI report comprises at least one second resource index; each of the first resource index and the second resource index comprises a CSI reference signals (CSI-RS) resource index or a synchronization signal block index;
  wherein the determining, according to the first CSI report and the second CSI report, whether the UE in the DRX inactive time reports a part or all of the first CSI report, comprises:
  when the at least one first resource index is different from the at least one second resource index, determining that the UE in the DRX inactive time reports a part or all of the first CSI report.

5. The method according to claim 1, wherein the first CSI report comprises: at least one first resource index and a first reference signal receiving power (RSRP) corresponding to each first resource index; the second CSI report comprises: at least one second resource index and a second RSRP corresponding to each second resource index; each of the first resource index and the second resource index comprises a CSI reference signals (CSI-RS) resource index or a synchronization signal block index;
  wherein the determining, according to the first CSI report and the second CSI report, whether the UE in the DRX inactive time reports a part or all of the first CSI report, comprises:
  in response to that the at least one first resource index is the same as the at least one second resource index and a difference between the first RSRP corresponding to any first resource index and the second RSRP corresponding to the second resource index which is the same as the any first resource index, is greater than or equal to a preset threshold, determining that the UE in the DRX inactive time reports a part or all of the first CSI report.

6. The method according to claim 1, wherein
  the first information is predefined; or,
  wherein before the reporting, by the UE, a channel state information (CSI) report only in response to receiving at least one first reference signal in DRX active time no later than a CSI reference resource, the method further comprises: receiving the first information transmitted by a network device.

7. The method according to claim 1, wherein the method further comprises:
  determining, according to second information, that the UE, only in the DRX active time, performs a first event; wherein the second information is configured to indicate that the UE, only in the DRX active time, performs the first event, and the first event comprises beam measurement and/or CSI measurement.

8. The method according to claim 7, wherein
  the second information is predefined; or,
  wherein before the determining, according to second information, that the UE, only in the DRX active time, performs a first event, the method further comprises: receiving the second information transmitted by a network device.

9. The method according to claim 1, wherein the method further comprises:
  determining, according to third information, that the UE, only in the DRX active time, receives the first reference signal; wherein the third information is configured to indicate that the UE, only in the DRX active time, receives the first reference signal; the first reference signal comprises at least one of the following: CSI reference signals (CSI-RS) for channel measurement, CSI-RS for interference measurement, CSI-interference measurement (IM) for interference measurement, CSI reference signals (CSI-RS) or synchronization signal block (SSB) for reference signal receiving power (RSRP) measurement.

10. The method according to claim 9, wherein
  the third information is predefined; or,
  wherein before the determining, according to third information, that the UE, only in the DRX active time, receives the first reference signal, the method further comprises: receiving the third information transmitted by a network device.

11. The method according to claim 7, wherein the second information is indicated by at least one of the following conditions:
  first condition: a CSI reference resource used by the UE in performing the first event is in the DRX active time;
  second condition: the UE receives the first reference signal at least once no later than the CSI reference resource; wherein the first reference signal comprises at least one of the following: CSI reference signals (CSI-RS) for channel measurement, CSI-RS for interference measurement, CSI-interference measurement (IM) for interference measurement, CSI reference signals (CSI-RS) or synchronization signal block (SSB) for reference signal receiving power (RSRP) measurement; the first reference signal is in an active time.

12. A user equipment (UE), comprising: a processor; wherein the processor is configured to,
  in response to that a discontinuous reception (DRX) mode is configured, report a channel state information (CSI) report only in response to receiving at least one first reference signal in DRX active time no later than a CSI reference resource;
  wherein before the processor reports the CSI report only in response to receiving at least one first reference signal in DRX active time no later than the CSI reference resource, the processor is further configured to,
  obtain a first CSI report and a second CSI report; wherein the second CSI report is a previous CSI report of the first CSI report;
  wherein when the processor reports the CSI report only in response to receiving at least one first reference signal in DRX active time no later than the CSI reference resource, the processor is further configured to,
  when indicating by first information, allowing the UE in the DRX inactive time to report the CSI report at a CSI report instant, determine, according to the first CSI report and the second CSI report, whether the UE in the DRX inactive time reports a part or all of the first CSI report.

13. The UE according to claim 12, wherein the first reference signal comprises at least one of the following: CSI reference signals (CSI-RS) for channel measurement, CSI-RS for interference measurement, CSI-interference measurement (IM) for interference measurement, CSI reference signals (CSI-RS) or synchronization signal block (SSB) for reference signal receiving power (RSRP) measurement.

14. The UE according to claim 12, wherein the processor is configured to measure the first reference signal to obtain the CSI report, wherein the first reference signal is measured in an active period.

15. The UE according to claim 12, wherein the processor is further configured to,
   determine, according to second information, that the UE, only in the DRX active time, performs a first event; wherein the second information is configured to indicate that the UE, only in the DRX active time, performs the first event, and the first event comprises beam measurement and/or CSI measurement.

16. The UE according to claim 15, wherein
   the second information is predefined; or,
   wherein before the processor determines, according to the second information, that the UE, only in the DRX active time, performs the first event, the processor is further configured to,
   receive the second information transmitted by a network device.

17. The UE according to claim 15, wherein the second information is indicated by at least one of the following conditions:
   first condition: a CSI reference resource used by the UE in performing the first event is in the DRX active time;
   second condition: the UE receives the first reference signal at least once no later than the CSI reference resource; wherein the first reference signal comprises at least one of the following: CSI reference signals (CSI-RS) for channel measurement, CSI-RS for interference measurement, CSI-interference measurement (IM) for interference measurement, CSI reference signals (CSI-RS) or synchronization signal block (SSB) for reference signal receiving power (RSRP) measurement; the first reference signal is in an active time.

18. A non-transitory computer readable storage medium, comprising a computer program stored thereon; wherein the computer program is executed by a processor to:
   in response to a discontinuous reception (DRX) mode is configured, report a channel state information (CSI) report only in response to receiving at least one first reference signal in DRX active time no later than a CSI reference resource;
   wherein before reporting the channel state information (CSI) report only in response to receiving at least one first reference signal in DRX active time no later than a CSI reference resource, the computer program is executed by the processor to obtain a first CSI report and a second CSI report; wherein the second CSI report is a previous CSI report of the first CSI report;
   wherein when reporting the channel state information (CSI) report only in response to receiving at least one first reference signal in DRX active time no later than a CSI reference resource, the computer program is executed by the processor to:
   when indicating by first information, allowing a UE in the DRX inactive time to report the CSI report at a CSI report instant, determine, according to the first CSI report and the second CSI report, whether the UE in the DRX inactive time reports a part or all of the first CSI report.

19. The non-transitory computer readable storage medium according to claim 18, wherein the first CSI report comprises at least one first resource index; the second CSI report comprises at least one second resource index; each of the first resource index and the second resource index comprises a CSI reference signals (CSI-RS) resource index or a synchronization signal block index;
   wherein when determining, according to the first CSI report and the second CSI report, whether the UE in the DRX inactive time reports a part or all of the first CSI report, the computer program is executed by the processor to:
   when the at least one first resource index is different from the at least one second resource index, determine that the UE in the DRX inactive time reports a part or all of the first CSI report.

20. The non-transitory computer readable storage medium according to claim 18, wherein the first CSI report comprises: at least one first resource index and a first reference signal receiving power (RSRP) corresponding to each first resource index; the second CSI report comprises: at least one second resource index and a second RSRP corresponding to each second resource index; each of the first resource index and the second resource index comprises a CSI reference signals (CSI-RS) resource index or a synchronization signal block index;
   wherein when determining, according to the first CSI report and the second CSI report, whether the UE in the DRX inactive time reports a part or all of the first CSI report, the computer program is executed by the processor to:
   in response to that the at least one first resource index is the same as the at least one second resource index and a difference between the first RSRP corresponding to any first resource index and the second RSRP corresponding to the second resource index which is the same as the any first resource index, is greater than or equal to a preset threshold, determine that the UE in the DRX inactive time reports a part or all of the first CSI report.

* * * * *